US006839143B2

(12) United States Patent
Otto

(10) Patent No.: US 6,839,143 B2
(45) Date of Patent: Jan. 4, 2005

(54) METHOD FOR THE INTERFEROMETRIC MEASUREMENT OF NON-ROTATIONALLY SYMMETRIC WAVEFRONT ERRORS

(75) Inventor: Wolfgang Otto, Aalen-Waldhausen (DE)

(73) Assignee: Carl Zeiss SMT AG, Oberkochen (DE)

( * ) Notice: Subject to any disclaimer, the term of this patent is extended or adjusted under 35 U.S.C. 154(b) by 426 days.

(21) Appl. No.: 10/045,260

(22) Filed: Nov. 7, 2001

(65) Prior Publication Data

US 2002/0063867 A1 May 30, 2002

(30) Foreign Application Priority Data

Nov. 25, 2000 (DE) .......................................... 100 58 650

(51) Int. Cl.[7] ................................................. G01B 9/02
(52) U.S. Cl. ...................................................... 356/512
(58) Field of Search ................................ 356/512, 513, 356/514, 489, 495, FOR 121, FOR 122

(56) References Cited

U.S. PATENT DOCUMENTS 5,982,490 A    11/1999   Ichikawa et al.

FOREIGN PATENT DOCUMENTS

JP             8233552         9/1996

OTHER PUBLICATIONS

Absolute calibration of an optical flat, Fritz, Optical Engineering, Jul./Aug. 1984, pp379–383.*
Absolute flatness testing by the rotation method with optimal measuring–error compensation, Schulz et al, Applied Optics, 7–1992, pp3767–3780.*
Optics Communications 161 (1999) 106–114.
Test optics error removal, Applied optics, vol. 35, No. 7, 1996.

* cited by examiner

Primary Examiner—Samuel A. Turner
(74) Attorney, Agent, or Firm—Welsh & Katz, Ltd.

(57) ABSTRACT

The method is used for the interferometric measurement, in particular for the interferometric absolute measurement, of non-rotationally symmetric wavefront errors on a specimen. The specimen can in this case be brought into a plurality of rotational positions, at least one measurement result being determined in each of the rotational positions. A mathematical evaluation of all measurement results is carried out in conclusion. The measurement is carried out in at least two measurement series (M, N). The measurement results ($M_1 \ldots M_m, N_1 \ldots N_n$) of each of the measurement series (M, N) are respectively determined in mutually equidistant rotational positions of the specimen. Each of the measurement series (M, N) comprises a specific number m, n of measurements. The individual numbers m, n are natural and mutually coprime numbers.

12 Claims, 1 Drawing Sheet

METHOD FOR THE INTERFEROMETRIC MEASUREMENT OF NON-ROTATIONALLY SYMMETRIC WAVEFRONT ERRORS

BACKGROUND OF THE INVENTION

The invention relates to a method for the interferometric measurement of non-rotationally symmetric wavefront errors on a specimen, which can be brought into a plurality of rotational positions.

More specifically the in ration refers to a method for the interferometric absolute measurement of non-rotationally symmetric wavefront errors on a specimen which can be brought into a plurality of rotational positions.

From the general prior art and general practice, such methods for the interferometric absolute measurement of non-rotationally symmetric wavefront errors of optical surfaces in reflection and optical elements in transmission are known. One established method is the so-called rotational position test with n equidistant rotations through 360°/n for absolute measurement of the non-rotationally symmetric errors of a specimen. Such a method is described, for example, by "R. Freimann, B. Dörband, F. Höller: "Absolute Measurement Of Non-Comatic Aspheric Surface Errors", Optics Communication, 161, 106–114, 1999".

Evans and Kestner show in "C. J. Evans, R. N. Kestner: "Test Optics Error Removal", Applied Optics, Vol. 35, 7, 1996" that generally, with n rotational positions, if these are averaged out correspondingly over the measurements, all non-rotationally symmetric errors with the exception of the orders k·n can be established absolutely, where k=1,2,3 . . . In general, this remaining residual error of the order k·n becomes commensurately smaller as more rotational positions are measured. There is great interest in developing fast and effective methods which permit a more efficient improvement [lacuna] analysis of the wavefront error.

JP 8-233552 has accordingly described a method in which, using mathematical methods, further points are determined in addition to the measured points in order to improve the accuracy if possible.

A more extensive method based thereon is described by U.S. Pat. No. 5,982,490. According to the "Third modified Example" described therein, four measurement values, which are arranged at predetermined non-equidistant spacings from one another are taken on a specimen. Through mathematical operations, further values are determined from these four measurement values, so that it is finally possible to achieve an evaluation accuracy which would otherwise have required the measurement of eight individual values at an equidistant spacing.

The disadvantage of this method is, however, that there are only four concrete measurement values here, which cover only half the circumference of the specimen, the other values being inherently "virtual" measurement results.

SUMMARY OF THE INVENTION

It is therefore the object of the invention to provide a method for the interferometric measurement of the non-rotationally symmetric wavefront errors of optical surfaces in reflection and/or optical elements in transmission, which provides a higher accuracy than the generally known rotational position test with a comparable number of measurement points, or which, with a significantly lower number of measurement points, provides a comparable accuracy to the rotational position test.

According to the invention, this object is achieved by a method for the interferometric measurement of non-rotationally symmetric wavefront errors on a specimen which can be brought into a plurality of rotational positions, at least one measurement result being determined in each of the rotational positions, and a concluding mathematical evaluation of all measurement results being carried out, wherein the measurement is carried out in at least two measurement series (M, N), the measurement results ($M_1$ . . . $M_m$, $N_1$ . . . $N_n$) of each of the measurement series (M, N) being determined in mutually equidistant rotational positions of the specimen, each of the measurement series (M, N) comprising a specific number n, m of measurements, m and n being natural and mutually coprime numbers.

Through the use of at least two independent measurement series, each of which has a number of equidistant measurement points, it is here possible to achieve a significant improvement in the measurement accuracy and/or a reduction in the number of individual measurement points required.

To that end, each of the at least two measurement series has a specific number of measurement results, for example m and n in the case of two measurement series. Through these m+n measured rotational positions and a corresponding mathematical evaluation, it is now possible to achieve the situation that all non-rotationally symmetric errors of the specimen with the exception of orders k·m·n can be established absolutely. In order to achieve the maximum achievable accuracy with a minimum number of measurements, the number of individual measurement results m and n must be mutually coprime.

Certainly, measurement methods with two measurement series M, N or three measurement series M, N, O are primarily to be regarded as an expedient application of the method according to the invention, although four, five, six or more measurement series are in principle also conceivable. In the case of two measurement series M, N which, for example, consist of a combination of m=5 measurements in the first measurement series M and n=7 measurements in the second measurement series N, a higher accuracy is achieved than in the case of a 12-position test, for example. With the proposed 5+7 measurements, one of the measurement results is furthermore duplicated, so that only 11 measurements in total need to be carried out here. With a corresponding 12-position test according to the prior art, all non-rotationally symmetric errors of the specimen up to the order k·12 can be established. With the cited example of the method according to the invention as a 5+7-position test, all errors with the exception of the orders k·5·7=k·35 can already be established with 11 measurements in total, i.e. one measurement less.

If this rotational position test is extended to three measurement series, for example with a 3+5+7-position test, then all errors up to the order k·3·5·7=k·105 can be established. In this test, only 13 measurements are necessary instead of the theoretical 15 measurements, since one of the measurements occurs three times. Hence, with approximately the same number of individual measurement results to be recorded, the accuracy of the measurement can be increased significantly with the method according to the invention, the entire circumference of the specimen furthermore being covered.

As an alternative to this, it would naturally also be possible to reduce the amount of measurement time through a corresponding reduction of the individual measurement results, for example a 3+4-position test which, since one measurement occurs twice, requires only 6 measurements. An accuracy up to errors of the order k·12 could likewise be achieved thereby, as in the previously known 12-position test. The decisive advantage here, however, is that the number of individual measurements, and therefore the required measurement time, for achieving a comparable accuracy is reduced by 50 percent.

BRIEF DESCRIPTION OF THE DRAWINGS

Further advantageous configurations and refinements of the invention can be found in the dependent claims and in the exemplary embodiments presented in outline below with the aid of the drawing, in which:

DETAILED DESCRIPTION OF THE PREFERED EMBODIMENTS

Figure 1:
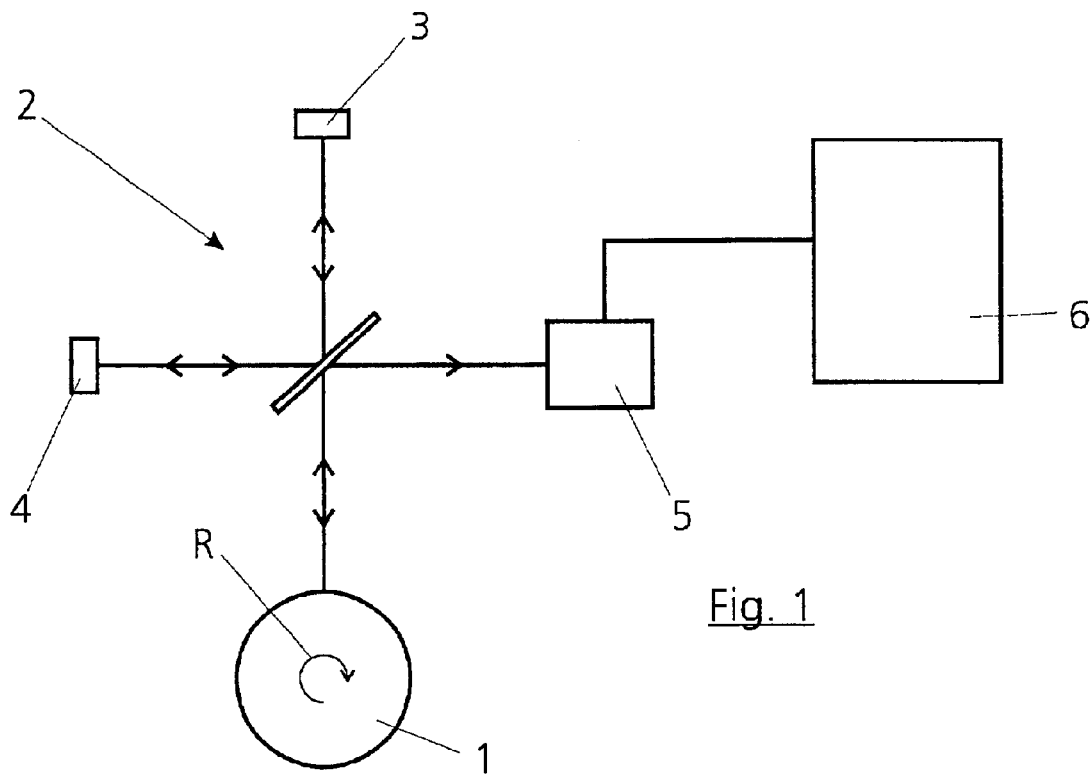
FIG. 1 shows a highly schematized representation of a measurement setup which is possible in principle.

FIG. 1 shows a highly schematized outline representation of a setup for carrying out the method for the interferometric measurement of non-rotationally symmetric wavefront errors on a specimen 1. An interferometric measuring instrument 2, indicated here in outline, is used for this. The interferometric measuring instrument 2 is schematically represented as a Michelson interferometer 2, although it may in principle be any other conceivable type of interferometric measuring instrument with the known facilities of splitting up the light paths, through semi-silvered mirrors, optical fibers, couplers or the like with open light paths or non-open light paths (e.g. fiber optic interferometer).

Besides a light source 3, the interferometric measuring instrument 2 has a reference element 4 and an instrument 5 for recording the interference pattern that is created. The instrument 5 is coupled to an evaluation unit 6 which, for example, is designed as an electronic data processing unit and in which the required mathematical evaluation of all measurement results can be carried out.

An arrow indicates the required relative rotational movement R between the interferometric measuring instrument 2 and the specimen 1, which needs to be carried out between the recording of the individual measurement results. The variant selected in this case for the schematic representation is the supposedly simple one in which the specimen 1 is rotated relative to the interferometric measuring instrument 2. It is, of course, also conceivable for the interferometric measuring instrument 2 to be rotated about the specimen 1.

Figure 2:
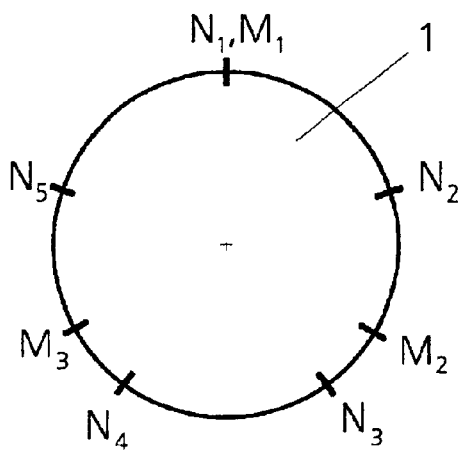
FIG. 2 shows the position of measurement points on a specimen using the example of a 3+5-position test.

FIG. 2 represents the position of measurement points using the example of m=3 and n=5 individual measurements of two measurement series M, N, which, for each measurement series M, N, are arranged distributed at equidistant spacings or angular positions over the entire circumference of the specimen 1.

In principle, the sequence in which the individual measurement values $M_1 \ldots M_m$, $N_1 \ldots N_n$ are recorded is unimportant in this case. It is, however, expedient for stability, and therefore the measurement reliability to be achieved in the setup, if the rotational direction of the relative rotational movement R between the interferometric measuring instrument 2 and the specimen 1 is maintained throughout the measurement.

In the exemplary embodiment represented, it could therefore be expedient to carry out the measurements in the sequence $M_1, M_2, M_3, N_2, N_3, N_4, N_5$. The measurement $N_1$ can in this case be omitted, since it is precisely this measurement result which is already known from the measurement $M_1$. By maintaining the rotational direction and the rotational angles, which are respectively equidistant within a measurement series, it is hence possible to achieve a very high stability of the setup in the method, which represents a good prerequisite for high-value measurement results. With this procedure, in which the m equidistant spacings of one measurement series M and then the n or, where applicable, (n−1) equidistant spacings of the other measurement series N are addressed, however, the situation arises that the specimen 1 needs to be rotated completely at least two times relative to the interferometric measuring instrument 2. Nevertheless, good reproducibility can be achieved here because of the angular spacings that can respectively be set equidistantly.

In principle, however, it is also conceivable to carry out the measurement method with only one rotation of the specimen, in which case the individual measurement positions according to the example in FIG. 2 are then addressed in the sequence $M_1, N_2, M_2, N_3, N_4, M_3, N_5$. Since the individual measuring points of each of the measurement series M, N need to be mutually equidistant and measurement points from the two measurement series M, N are now determined in mixed fashion, the required mechanical accuracy of the setup for carrying out the relative rotational movements R is in this case somewhat higher, since the measurement points to be successively recorded no longer lie at a mutually equidistant spacing from each other here, and this situation is more difficult to implement with the required accuracy and reproducibility.

The achievable measurement accuracy of the described method and a description of the possibilities for evaluating the measurement results that are obtained will be given below with the aid of mathematical algorithms.

Basically, in any interferometric testing of the specimen 1 for wavefront errors, the measured wavefront $$W = P + T$$

can be represented as a sum of the wavefront errors of the specimen:

$$P = P_r + P_{nr}$$

and of the interferometer:

$$T = T_r + T_{nr}.$$

In this case, $P_r$ and $T_r$ respectively denote the rotationally symmetric components, and $P_{nr}$ and $T_{nr}$ the non-rotationally symmetric components of the measured wavefront. For representation of the wavefront in a sum notation, the following is hence obtained:

$$W = T_r + T_{nr} + P_r + P_{nr} \tag{1}.$$

Now if, in a measurement according to the prior art, m rotational positions at an azimuthal spacing of 360°/m are measured and averaged out, then all non-rotationally symmetric errors of the specimen 1 drop out, with the exception of the orders k·m·è (with k=1,2,3, ... ), which gives:

$$<W>_m = T_r + T_{nr} + P_r + P_{nr}^{km\grave{e}} \tag{2}.$$

In order to determine the error of the specimen 1, equation (2) can now be subtracted from equation (1), and all non-rotationally symmetric errors of the specimen 1 up to the orders k·m·è are obtained with:

$$W - <W>_m = P_r - P_{nr}^{km\grave{e}} \tag{3}.$$

If e.g. the rotational position test with m=12 rotational positions is assumed, then this means that all non-rotationally symmetric errors of the specimen 1 up to the orders 12, 24, 36, . . . are obtained. This means that the errors in the vicinity of the $12^{th}$ periodicity, $24^{th}$ periodicity, $36^{th}$ periodicity etc. cannot be recorded with this measurement method.

If, in the method, a further measurement series with n rotational positions is now carried out in a similar way to the measurement described in the introduction, which is known from the prior art, then the following is obtained in a similar way to that described above:

$$<W>_n = T_r + T_{nr} + P_r + P_{nr}^{kn\grave{e}} \quad (4).$$

and $$W - <W>_m = P_r - P_{nr}^{kn\grave{e}} \quad (5).$$

If the results of equations (2) and (4) are now subtracted from one another, the error contributions of the orders k·m·è and k·n·è are obtained, with the exception of the orders k·m·n·è that are actually contained in both of the measurement series M, N, with:

$$<W>_m - <W>_n = P_{nr}^{km\grave{e}} - P_{nr}^{kn\grave{e}} \quad (6).$$

A prerequisite for this, of course, is that m and n are coprime numbers.

If this wavefront described by equation (6) is now computationally rotated m times, for example with the aid of a corresponding software program, and the results are averaged out, then the k·n·è terms drop out.

If the result obtained is added to equation (3), then the non-rotationally symmetric errors of the specimen 1, with the exception of the k·m·n·è terms, are obtained with:

$$W_m = W - <W>_m + <<W>_m - <W>_n>_m = P_{nr} - P_{nr}^{kmn\grave{e}} \quad (7).$$

In a similar way to this, it is naturally also possible to calculate the result for n rotational positions, in order to use it for further averaging or for analysis.

This method hence offers the opportunity, merely with a number of measurements m+n, to determine all non-rotationally symmetric errors of the specimen 1, with the exception of the orders k·n·m. A combination of 5+7 measurements, which corresponds to 11 individual measurements because of the one measurement that occurs twice, is therefore much more accurate than the rotational position test with, for example, 12 measurement points.

As an alternative to this, of course, it is also possible to achieve similar accuracies to the aforementioned 12-position test with fewer individual measurements, for example, 3+4 measurements. Since, however, only 6 measurement points are needed for this, one of the theoretical 7 measurement points occurring twice, the required measurement time, or the required measurement work, can be halved.

An alternative formulation will be described below, which is obtained when the individual measurements according to equation (1) are computationally rotated back to a common azimuthal position before being determined. In this case, the non-rotationally symmetric interferometer errors, with the exception of the orders k·m·è, are removed:

$$<W>_m = T_r + T_{nr}^{km\grave{e}} + P_r + P_{nr} \quad (8).$$

If the mean radial profile of the wavefront $$W_{RP} = T_r + P_r \quad (9)$$

is now computationally established, and is subtracted from the wavefront according to equation (8), than all non-rotationally symmetric errors of the specimen 1 and, in addition, also the non-rotationally symmetric errors of the interferometer 2 of the orders k·m·è, are obtained with:

$$<W>_m - W_{RP} = P_{nr} + T_{nr}^{km\grave{e}} \quad (10).$$

If the same procedure is performed in a similar way with n rotational positions, then this gives:

$$<W>_n = T_r + P_r + P_{nr} + T_{nr}^{kn\grave{e}} \quad (11)$$

and $$<W>_n - W_{RP} = P_{nr} + T_{nr}^{kn\grave{e}} \quad (12).$$

If the two results of equations (8) and (11) are now subtracted from one another, the error contributions of the orders k·m·è and k·n·è, with the exception of the orders k·m·n·è, are obtained so long as m and n are again coprime numbers, since they are contained in both of the measurement series M, N, as:

$$<W>_m - <W>_n = T_{nr}^{km\grave{e}} - T_{nr}^{kn\grave{e}} \quad (13).$$

If the wavefront described by equation (13) is now computationally rotated m times and averaged out, the k·n·è terms again drop out. One could say that the determined error is again subjected to a rotational position test, albeit on a purely mathematical or virtual basis.

Subtracting the result from equation (10) gives, with:

$$W_m = <W>_m - W_{RP} - <<W>_m - <W>_n>_m = P_{nr} + T^{kmn\grave{e}} \quad (14).$$

The non-rotationally symmetric errors of the specimen, including the k·m·n·è terms of the interferometer error. Here again, the result for n rotational positions can be calculated in a similar way to this, in order to use it for further averaging or for analysis.

The error can, of course, be further minimized by additional rotational positions. For instance, even higher accuracies can be achieved with three measurement series M, N, O. With a 3+5+7-position test, i.e. with m=3, n=5 and o=7 individual measurements, all errors up to the orders k·105 can be determined. Since three of the individual measurements occur twice, 13 measurement points in total are sufficient to achieve the corresponding accuracy. Here as well, it is again assumed that the numbers m, n, o are coprime natural numbers.

If n+m measurements are now combined, as indicated above, then the non-rotationally symmetric errors of the specimen 1, with the exception of the k·m·n·è terms, are obtained in a similar way to equation (7) with:

$$W_M = W - <W>_m + <<W>_m - <W>_n>_m = P_{nr} - P_{nr}^{kmn\grave{e}} \quad (15).$$

Furthermore, the non-rotationally symmetric errors of the specimen 1 with the exception of the k·n·o·è terms, are obtained from the combination of the measurements n+o:

$$W_O = W - <W>_o + <<W>_o - <W>_n>_o = P_{nr} - P_{nr}^{kno\grave{e}} \quad (16).$$

If the two equations (15) and (16) are now subtracted from one another, the error contributions of the orders k·m·n·è and k·n·o·è, with the exception of the orders k·m·n·o·è since these are actually contained in both results, are obtained with:

$$W_O - W_M = P_{nr}^{knm\grave{e}} - P_{nr}^{kno\grave{e}} \quad (17).$$

If this wavefront described by equation (17) is now also computationally rotated m times and averaged out, the k·n·o·è terms drop out. By adding the result to equation (15), the non-rotationally symmetric errors of the specimen 1, with the exception of the k·m·n·o·è terms, are obtained in a similar way to equation (7), with:

$$W_{mn}=W-<W>_m+<<W>_m-<W>_n>_m+<W_o-W_M>=P_{nr}-P_{nr}^{kmn\alpha\dot{e}} \quad (18).$$

Here again, the results for n rotational positions can naturally be calculated and used for further averaging or for analysis, as already mentioned above.

Again here as well, algorithms which take into account the non-rotationally symmetric interferometer errors with three measurement series can be achieved here as well by computational rotation to a common azimuthal position, in a similar way to the procedure with two measurement series M, N. Corresponding algorithms for measurement methods having more than three measurement series M, N, O, . . . are likewise obtained in a similar way to the possibilities described above.

What is claimed is:

1. A method for the interferometric measurement of non-rotationally symmetric wavefront errors on a specimen capable of being brought into a plurality of rotational positions, the method comprising the steps of determining at least one measurement result in each of the rotational positions, and carrying out a concluding mathematical evaluation of all measurement results, wherein the measurement is carried out in at least two measurement series (M, N), the measurement results ($M_l$ . . . $M_m$, $N_l$ . . . $N_n$) of each of the measurement series (M, N) being determined in mutually equidistant rotational positions of the specimen, each of the measurement series (M, N) comprising a specific number n, m of measurements, m and n being natural and mutually coprime numbers, the measurement results ($M_l$ . . . $M_m$, $N_l$ . . . $N_o$) of each of the at least two measurement series (M, N) are evaluated independently of one another for non-rotationally symmetric wavefront errors ($<W>_m$, $<W>_o$) on the specimen, the difference of the at least two non-rotationally symmetric wavefront errors ($<W>_m$, $<W>_o$) being formed, whereupon the difference ($<W>_m - <W>_o$) that is formed is computationally rotated m or n times and the results are averaged out, and whereupon at least one of the wavefront errors ($<W>_m$, $<W>_o$) is corrected with the result ($<<W>_m - W>_o>_m$) averaged in this way.

2. The method as claimed in claim 1, wherein the measurement results ($M_l$ . . . $M_m$, $N_l$ . . . $N_n$) of each of the at least two measurement series (M, N) are evaluated independently of one another for non-rotationally symmetric wavefront errors ($<W>_m$, $<W>_n$) on the specimen, the difference of the at least two non-rotationally symmetric wavefront errors ($<W>_m$, $<W>_n$) being formed, whereupon the difference ($<W>_m - <W>_n$) that is formed is computationally rotated m or n times and the results are averaged out and whereupon at least one of the wavefront errors ($<W>_m$, $<W>_n$) is corrected with the result ($<<W>_m - <W>_n>_n$) averaged in this way.

3. The method as claimed in claim 1, wherein the wavefront error ($<W>_m$, $<W>_n$) is corrected with the averaged result ($<<W>_m - <W>_n>_n$) by addition.

4. The method as claimed in claim 1, wherein the wavefront error ($<W>_m$, $<W>_n$) is corrected with the averaged result ($<<W>_m - <W>_n>_m$) by subtraction.

5. A method for the interferometric measurement of non-rotationally symmetric wavefront errors on a specimen which can be brought into a plurality of rotational positions, at least one measurement result being determined in each of the rotational positions, and a concluding mathematical evaluation of all measurement results being carried out, wherein the measurement is carried out in at least two measurement series (M, N), the measurement results ($M_l$ . . . $M_m$, $N_l$ . . . $N_n$) of each of the measurement series (M, N) being determined in mutually equidistant rotational positions of the specimen, each of the measurement series (M, N) comprising a specific number n, m of measurements, m and n being natural and mutually coprime numbers, the measurement results ($M_l$ . . . $M_m$, $N_l$ . . . $N_n$) of each of the at least two measurement series (M, N) are evaluated independently of one another for non-rotationally symmetric wavefront errors ($<W>_m$, $<W>_n$) on the specimen, the difference of the at least two non-rotationally symmetric wavefront errors ($<W>_m$, $<W>_n$) being formed, whereupon the difference ($<W_m> - <W>_n$) that is formed is computationally rotated m or n times and the results are averaged out and whereupon at least one of the wavefront errors ($<W>_m$, $<W>_n$) is corrected with the result ($<<W>_m - <W>_n>_n$) averaged in this way.

6. The method as claimed in claim 5, wherein the wavefront error ($<W>_m$, $<W>_n$) is corrected with the averaged result ($<<W>_m - <W>_n>_n$) by addition.

7. The method as claimed in claim 5, wherein the wavefront error ($<W>_m$, $<W>_n$) is corrected with the averaged result ($<<W>_m - <W>_n>_n$) by subtraction.

8. The method as claimed in claim 1 or 5, wherein an interferometric absolute measurement is made.

9. The method as claimed in claim 1 or 5, wherein in the first measurement series (M), the m measurement results ($M_l$ . . . $M_m$) are determined in m equidistant rotational positions of the specimen, whereupon the specimen is displaced into a rotational position not equidistant thereto, which is followed by the at least one second measurement series (N) in which the n measurement results ($N_l$ . . . $N_n$) are determined in the n equidistant rotational positions of the specimen.

10. The method as claimed in claim 1 or 5, wherein the individual measurement results ($M_l$ . . . $M_m$, $N_l$ . . . $N_n$) of the at least two measurement series (M, N) are determined in an unordered sequence with respect to one another.

11. The method as claimed in claim 1 or 5, wherein the rotational direction of a relative rotational movement (R) is kept unchanged during the recording of all measurement results ($M_l$ . . . $M_m$, $N_l$ . . . $N_n$).

12. The method as claimed in claim 1 or 5, wherein the equidistant rotational positions of the measurement results ($M_l$ . . . $M_m$, $N_l$ . . . $N_n$) of the individual measurement series (M, N) are respectively determined from the ratios of a complete rotation (360°) and the respective number m, n of the measurements of each of the measurement series (M, N).

* * * * *

UNITED STATES PATENT AND TRADEMARK OFFICE
CERTIFICATE OF CORRECTION

PATENT NO.        : 6,839,143 B2
APPLICATION NO. : 10/045260
DATED              : November 7, 2001
INVENTOR(S)      : Otto It is certified that error appears in the above-identified patent and that said Letters Patent is hereby corrected as shown below:

Column 6, line 9
Please delete "…$<W>_n\text{-}T_r$…" and insert --…$<W>_n=T_r$…--.

Claim 1, line 15
Please delete "…$N_o$…" and insert --…$N_n$…--.

Col. 7, Claim 1, lines 37, 39, 40, 43, and 44
Please delete "…$<W>_o$…" and insert --…$<W>_n$…--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 6,839,143 B2
APPLICATION NO. : 10/045260
DATED : January 4, 2005
INVENTOR(S) : Otto It is certified that error appears in the above-identified patent and that said Letters Patent is hereby corrected as shown below:

Column 6, line 9
Please delete "…$<W>_n\text{-}T_r$…" and insert --…$<W>_n=T_r$…--.

Claim 1, line 15
Please delete "…$N_o$…" and insert --…$N_n$…--.

Col. 7, Claim 1, lines 37, 39, 40, 43, and 44
Please delete "…$<W>_o$…" and insert --…$<W>_n$…--.

This certificate supersedes Certificate of Correction issued August 28, 2007.

Signed and Sealed this

Twenty-fifth Day of September, 2007

JON W. DUDAS
*Director of the United States Patent and Trademark Office*